US012705382B2

(12) United States Patent
Taneja et al.

(10) Patent No.: US 12,705,382 B2
(45) Date of Patent: Aug. 11, 2026

(54) SYSTEM AND METHOD FOR PROTECTING SOURCE CODE FROM UNAUTHORIZED ACCESS

(71) Applicant: Bank of America Corporation, Charlotte, NC (US)

(72) Inventors: Pushkar Taneja, Telangana (IN); Suryanarayana Adivi, Telangana (IN); Shailendra Singh, Maharashtra (IN); Sunilkumar Sriperambudur, Telangana (IN)

(73) Assignee: Bank of America Corporation, Charlotte, NC (US)

(*) Notice: Subject to any disclaimer, the term of this patent is extended or adjusted under 35 U.S.C. 154(b) by 70 days.

(21) Appl. No.: 18/647,372

(22) Filed: Apr. 26, 2024

(65) Prior Publication Data

US 2025/0335616 A1 Oct. 30, 2025

(51) Int. Cl.
*G06F 21/62* (2013.01)
*G06F 8/41* (2018.01)

(52) U.S. Cl.
CPC ............ *G06F 21/6218* (2013.01); *G06F 8/41* (2013.01)

(58) Field of Classification Search
None
See application file for complete search history.

(56) References Cited

U.S. PATENT DOCUMENTS 7,051,200 B1 * 5/2006 Manferdelli ........ G06F 21/6218 713/153
8,468,244 B2 6/2013 Redlich et al.
8,769,063 B2 7/2014 Barton et al.
8,806,570 B2 8/2014 Barton et al.
8,844,048 B2 9/2014 Markle, Jr. et al.
8,997,208 B2 3/2015 Champagne et al.
9,043,480 B2 5/2015 Barton et al.
9,143,529 B2 9/2015 Qureshi et al.
9,245,148 B2 1/2016 Runkis et al.
9,305,163 B2 4/2016 Murphy
9,594,580 B2 3/2017 Runkis et al.
9,635,033 B2 4/2017 Nguyen-Tuong et al.
9,674,173 B2 6/2017 Fox
10,084,817 B2 9/2018 Saher et al.
10,176,324 B2 1/2019 Davidson et al.
10,594,705 B2 3/2020 Xu et al.
11,042,631 B2 6/2021 Ghosh et al.
11,720,666 B2 8/2023 Xu et al.
(Continued)

*Primary Examiner* — Brandon Hoffman

(57) ABSTRACT

A system for protecting source code from unauthorized access is disclosed. The system is configured to scan the source code and identify code segments, including function code. The system may perform code obfuscation, code separation, and code encryption. The system may extract a first set of code features from the function code. The first set of code features indicates a first task associated with the function code. The system accesses a training dataset comprising a sample code that is associated with a second task and a template code. The system compares the first task with the second task. In response to determining that the first task corresponds to the second task, the system obfuscates the function code with the template code. In response, the system updates the source code to include the obfuscated function code.

20 Claims, 3 Drawing Sheets

(56) References Cited

U.S. PATENT DOCUMENTS

| | | | | |
|---|---|---|---|---|
| 2006/0031686 | A1* | 2/2006 | Atallah | G06F 12/1408 711/E12.092 |
| 2014/0165208 | A1* | 6/2014 | Chevallier-Mames | G06F 21/14 726/26 |
| 2019/0089720 | A1 | 3/2019 | Aditham et al. | |
| 2019/0238563 | A1 | 8/2019 | Kulkarni et al. | |
| 2019/0272375 | A1 | 9/2019 | Chen | |
| 2023/0077130 | A1* | 3/2023 | Matsuoka | G06Q 10/06313 |
| 2025/0060951 | A1* | 2/2025 | Feith | G06F 8/425 |

* cited by examiner

SYSTEM AND METHOD FOR PROTECTING SOURCE CODE FROM UNAUTHORIZED ACCESS

TECHNICAL FIELD

The present disclosure relates generally to information security, and more specifically to a system and method for protecting source code from unauthorized access.

BACKGROUND

Software applications and computer devices use application programming interfaces (APIs) to communicate with each other. The API may be implemented in source code and facilitate the communication of data to computer devices when the data is requested.

SUMMARY

The system described in the present disclosure is particularly integrated into practical applications of improving code security and protection techniques and the functioning of computer systems that are tasked to maintain and execute source code. This approach provides technical advantages and improvements such as reduced computing and network resources for code security and protection techniques.

In the current systems, software applications use application programming language (API) requests to communicate with other software applications and devices. An API may act as an interface to access a respective software application and device. Bad actors may attempt to gain access to the source code of the API in order to gain access to the software application and devices, user information stored at the software application, and sensitive data, among others. Thus, APIs are usually targeted by bad actors to access software applications, devices, databases, and the like. In some cases, bad actors may attempt to reverse engineer the source code associated with an API, which if it remains undetected and unaddressed, may lead to data breaches and unauthorized access to the software application and devices.

The disclosed system provides a solution to this and other technical problems in the realm of code security and protection. In some embodiments, the system may be configured to implement a machine learning algorithm to dynamically implement one or more of code obfuscation operations, code separation operations, and code encryption operations to one or more code segments of the source code. The system, e.g., via the machine learning algorithm, may scan the API source code to detect code functions, classes, loops, conditional statements, data structures, and other attributes of the source code.

In the case of code obfuscation operation, the machine learning algorithm may obfuscate one or more segments of the source code to make the source code and its functions more difficult to reverse engineer. For example, the machine learning algorithm may change variable names to other, irrelevant variable names that are not related to the function of the code where each variable is used. In another example, the machine learning algorithm may detect a function code and add a template code to make the function code seem more complex, where the template code is selected such that it does not alter the task associated with the function code. This process may be done through a training dataset comprising a set of sample codes, where each sample code is associated with a respective task and a template code. The machine learning algorithm may identify a sample code, within the training dataset, which is configured to perform the same task as the function code, within the source code. In response, the machine learning algorithm may add the template code that is associated with the identified sample code to the function code.

In another example, the machine learning algorithm may replace a function code with a more complex function code. In another example, the machine learning algorithm may encrypt comment lines in the source code using an encryption function. The comment lines may explain the function of the source code in plain text. By encrypting the comment lines, the source code becomes more difficult to reverse engineer. In another example, the machine learning algorithm may transform the data structure of one or more code segments to other data structures. For example, the machine learning algorithm may change a first array to a hash table, a second array to a linked list, etc. Using various data structures increases the security of the source code and makes it more difficult to reverse engineer.

In case of code separation operation, the system, via the machine learning algorithm, may scan the API source code, as explained above, and separate a given function code into smaller code segments according to a code splitting rule. The code splitting rule may indicate that a given function code is to be split such that each split code segment, individually, does not infer a task that the given function code is configured to perform.

In the case of the code encryption operation, the system, via the machine learning algorithm, may scan the API source code and dynamically encrypt one or more segments of the source code. For example, the machine learning algorithm may identify the segments where sensitive information is indicated and encrypt the identified segments. In some embodiments, the machine learning algorithm may use symmetric and/or asymmetric encryption methods.

The system, e.g., via the machine learning algorithm, may undo any added complexity, template code, changed variable names, code separation, code obfuscation, and code encryption before compiling the source code. Thus, the source code in its original form may be compiled for use.

In some embodiments, the system improves the code security and protection of source code by implementing dynamic code obfuscation, separation, and encryption of various code segments. Thus, this multi-factor approach increases the security of the source code from unauthorized access by adding multiple additional security layers to the source code. In some embodiments, the system conserves processing and memory resources of the server that is tasked to maintain and execute the source code and perform code obfuscation, separation, and encryption on the source code. For example, in response to increasing the security of the source code, the data associated with the source code is protected from unauthorized access, which in turn, leads to the security of the server being increased.

In some embodiments, a system for securing source code from unauthorized access comprises a memory operably coupled with a processor. The memory is configured to store source code comprising a set of code lines, wherein the set of code lines comprises a first function code. The memory is further configured to store a training dataset comprising a set of sample codes, wherein a first sample code from among the set of sample codes is associated with a first task which the first sample code is configured to perform and a first template code. The processor is configured to receive an instruction to obfuscate at least a portion of the source code. The processor is further configured to scan the source code in response to receiving the instruction. In response to scanning the source code, the processor is further configured to extract a first set of code features from the source code, wherein the first set of code features comprises an indication of a second task that the first function code is configured to perform. The processor is further configured to compare the first task with the second task. The processor is further configured to determine that the first task corresponds to the second task. In response to determining that the first task corresponds to the second task, the processor is further configured to obfuscate the first function code, wherein obfuscating the first function code comprises updating the first function code with the first template code, wherein updating the first function code with the first template code comprises replacing at least a portion of the first function code with the first template code. The processor is further configured to update the source code to include the updated first function code.

These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
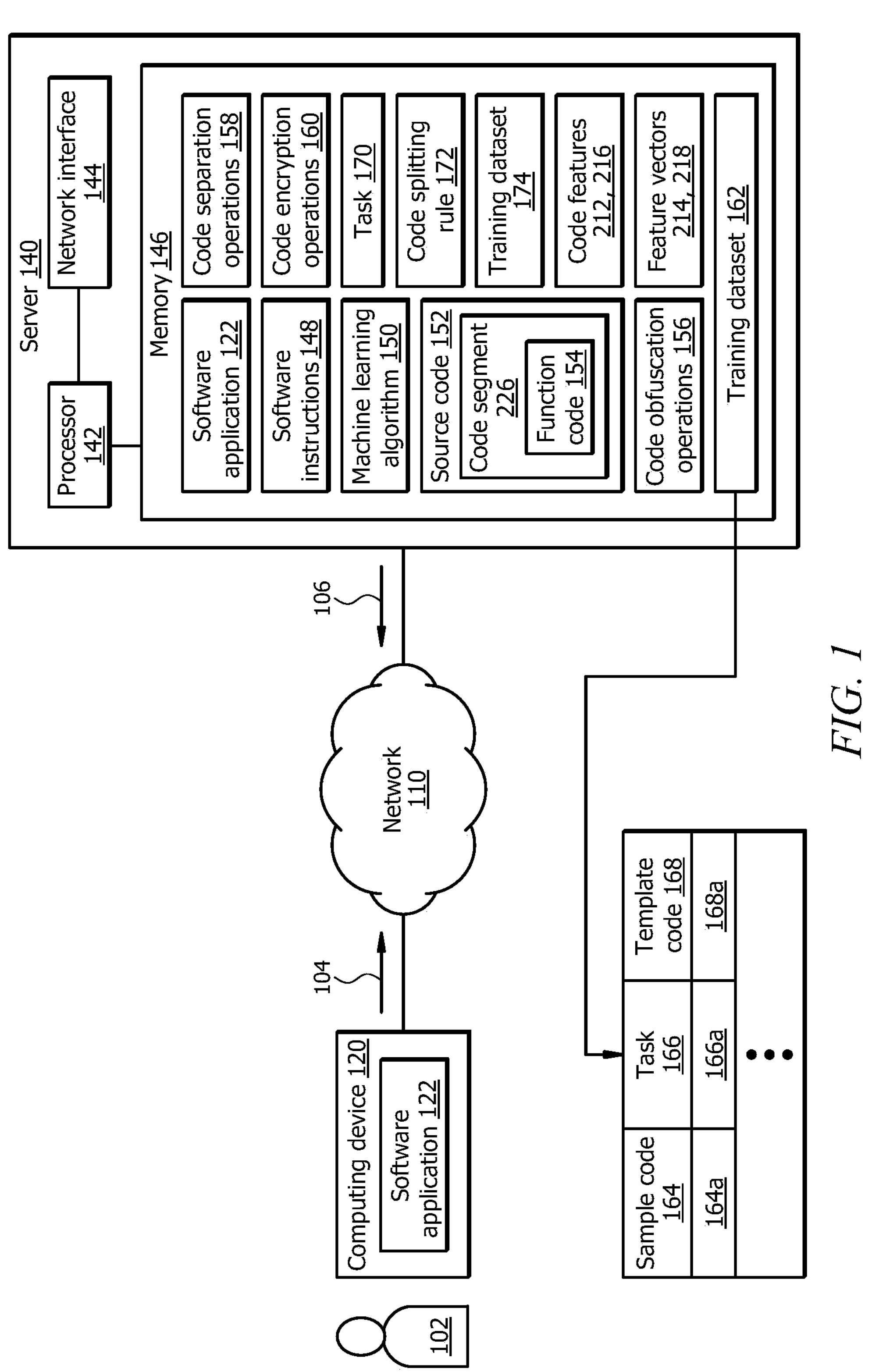
FIG. 1 illustrates an embodiment of a system configured to protect source code from unauthorized access.
Figure 2:
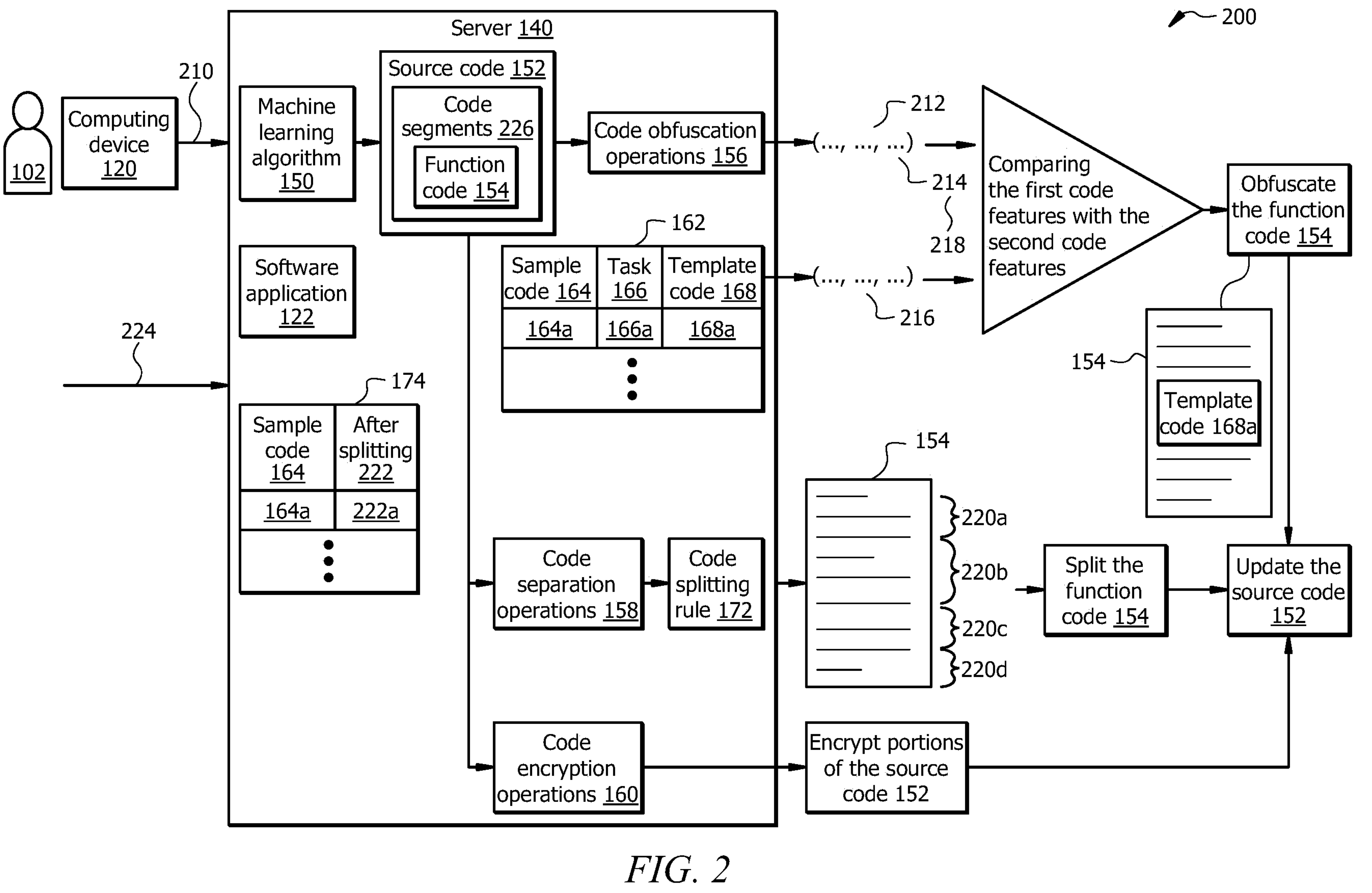
FIG. 2 illustrates an example operational flow of the system of FIG. 1.
Figure 3:
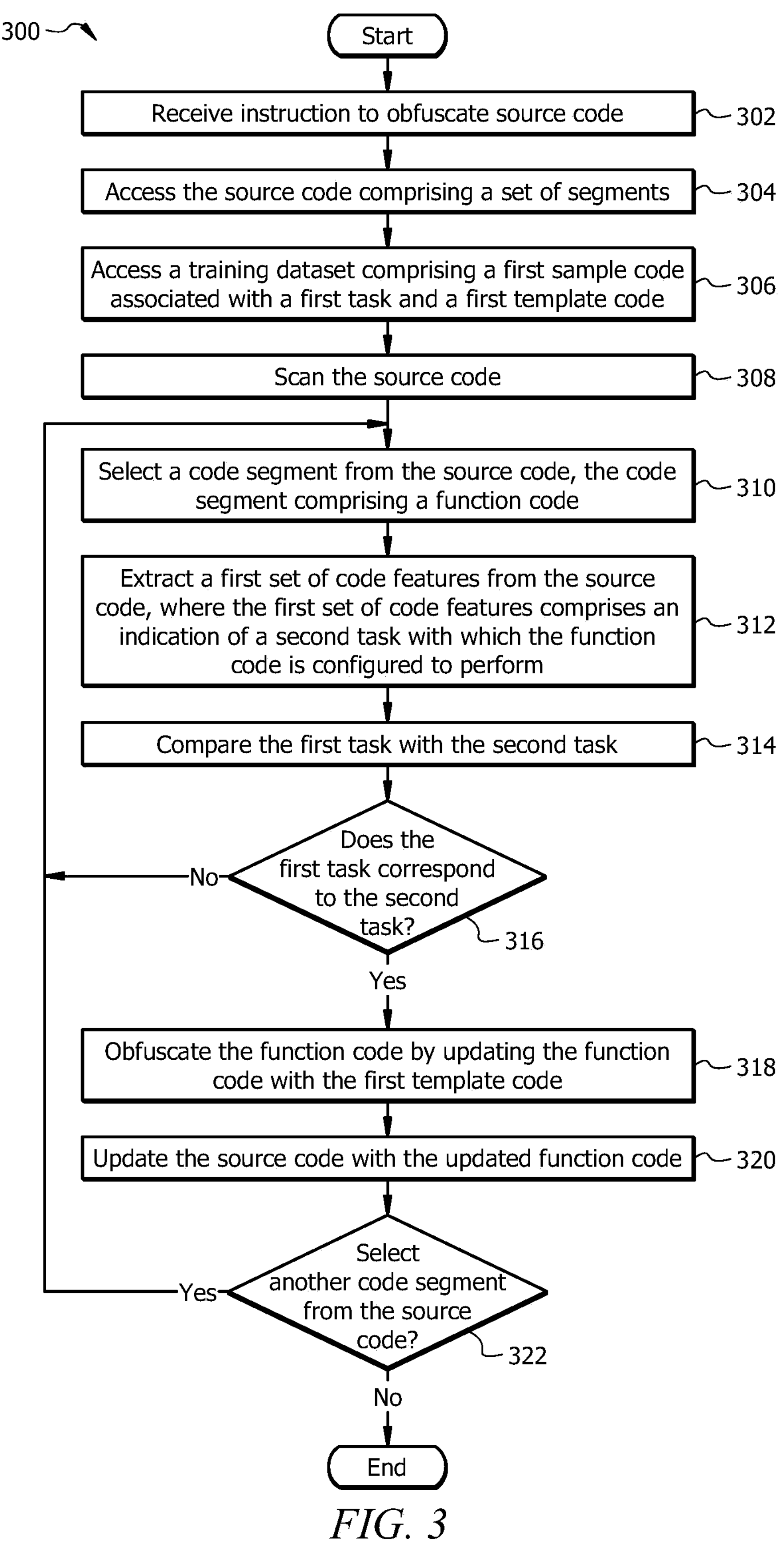
FIG. 3 illustrates an example flowchart of a method to protect source code from unauthorized access.

As described above, previous technologies fail to provide efficient and reliable solutions to increase the security of source code and protect source code from unauthorized access. Embodiments of the present disclosure and its advantages may be understood by referring to FIGS. 1 through 3. FIGS. 1 through 3 are used to describe systems and methods to increase the security of source code and to protect source code from unauthorized access, according to some embodiments.

System Overview

FIG. 1 illustrates an embodiment of a system 100 that is generally configured to protect source code from unauthorized access by a variety of methods, including code obfuscation, code separation, and code encryption. In some embodiments, the system 100 comprises a server 140 operably coupled to one or more computing devices 120 via a network 110. The network 110 enables the communication between the server 140 and computing devices, such as servers, desktop computers, workstations, and the like. A user 102 may use the computing device 120 to send an application programming language (API) request 104 that indicates to perform one or more of code obfuscation, code separation, and code encryption on the source code 152 to the server 140. In response, the server 140 may perform one or more of these methods to protect the source code 152 from unauthorized access from bad actors and unauthorized users.

In general, the system 100 provides technical improvement to the code security and protection techniques. In the current systems, software applications use API requests to communicate with other software applications 122 and devices (e.g., computing devices 120 and servers 14). An API may act as an interface to access a respective software application 122 and devices (e.g., computing devices 120 and servers 14). Bad actors may attempt to gain access to the source code 152 of the API to gain access to the software application 122 and devices (e.g., computing devices 120 and servers 14), user information stored at the software application 122, and sensitive data, among others. Thus, APIs are usually targeted by bad actors to access software applications 122, devices, databases, etc. In some cases, the bad actor may attempt to reverse engineer the source code 152 associated with an API, which if it remains undetected and unaddressed, may lead to data breaches and unauthorized access to the software application 122 and devices (e.g., computing devices 120 and servers 14).

The disclosed system 100 provides a solution to this and other technical problems in the realm of code security and protection. In some embodiments, the system 100 may be configured to implement a machine learning algorithm 150 to dynamically implement one or more code obfuscation operation 156, code separation operation 158, and code encryption operation 160 to one or more code segments of the source code 152. The system 100, e.g., via the machine learning algorithm 150, may scan the API source code 152 to detect code functions, classes, loops, conditional statements, data structures, and other attributes of the source code 152.

In the case of code obfuscation operation 156, the machine learning algorithm 150 may obfuscate one or more segments 226 of the source code 152 to make the source code 152 and its functions more difficult to reverse engineer. For example, the machine learning algorithm 150 may change variable names to other, irrelevant variable names that are not related to the function of the code where each variable is used. In another example, the machine learning algorithm 150 may detect a function code 154 and add a template code 168 to make the function code 154 seem more complex, where the template code 168 is selected such that it does not alter the task 170 associated with the function code 154. This process may be done through a training dataset 162 comprising a set of sample code 164, where each sample code 164 is associated with a respective task 166 and a template code 168. The machine learning algorithm 150 may identify a sample code 164, within the training dataset 162, that is configured to perform the same task 166 as the function code 154, within the source code 152. In response, the machine learning algorithm 150 may add the template code 168 which is associated with the identified sample code 164 to the function code 154.

In another example, the machine learning algorithm 150 may replace a function code 154 with a more complex function code 154. In another example, the machine learning algorithm 150 may encrypt comment lines in the source code 152 using an encryption function. The comment lines may explain the function of the source code in plain text. By encrypting the comment lines, the source code 154 becomes more difficult to reverse engineer. In another example, the machine learning algorithm 150 may transform the data structure of one or more code segments to other data structures. For example, the machine learning algorithm 150 may change a first array to a hash table, a second array to a linked list, etc. Using various data structures increases the security of the source code 152 and makes it more difficult to reverse engineer.

In case of code separation operation 158, the system 100, via the machine learning algorithm 150, may scan the API source code 152, as explained above, and separate a given function code 154 into smaller code segments according to a code splitting rule 172. The code splitting rule 172 may indicate that a given function code 154 is to be split such that each split code segment, individually, does not infer a task 170 which the given function code 154 is configured to perform.

In the case of code encryption operation 160, the system 100, via the machine learning algorithm 150, may scan the API source code 154 and dynamically encrypt one or more segments of the source code 152. For example, the machine learning algorithm 150 may identify the segments where sensitive information is indicated and encrypt the identified segments. In some embodiments, the machine learning algorithm 150 may use symmetric and/or asymmetric encryption methods.

The system 100, e.g., via the machine learning algorithm 150, may undo any added complexity, template code 168, changed variable names, code separation, code obfuscation, and code encryption before compiling the source code 152. Thus, the source code 152 in its original form may be compiled for use.

In some embodiments, the system 100 improves the code security and protection of source code 152 by implementing dynamic code obfuscation, separation, and encryption of various code segments. Thus, this multi-factor approach increases the security of the source code 152 from unauthorized access by adding multiple additional security layers to the source code 152. In some embodiments, the system 100 conserves processing and memory resources of the server 140 that is tasked to maintain and execute the source code 152, and perform code obfuscation, separation, and encryption on the source code 152. For example, in response to increasing the security of the source code 152, the data associated with source code 152 is protected from unauthorized access, which in turn, leads to the security of the server 140 being increased.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4*th* generation (4G) or 5*th* generation (5G)), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skills in the art.

Example Computing Device

Computing device 120 may be any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device), or any other suitable type of device. The computing device 120 may include a user interface, such as a display, a microphone, a camera, a keypad, or other appropriate terminal equipment usable by user 102.

The computing device 120 may include a hardware processor, memory, and/or circuitry configured to perform any of the functions or actions of the computing device 120 described herein. For example, the computing device 120 includes a processor in signal communication with a network interface, and a memory (not explicitly shown). The memory stores software instructions that when executed by the processor cause the processor to perform one or more operations of the computing device described herein.

In some examples, the user 102 may be an authorized user who is authorized to access the source code 152. In these examples, the user 102 may use the computing device 120 to transmit the API request 104 to the server 140. The API request 104 may be associated with the source code 152. In some examples, the API request 104 may instruct the machine learning algorithm 150 to secure the source code 152 by adding additional security layers as described herein, e.g., performing code obfuscation operations 156, code separation operation 158, and code encryption operation 160 on one or more segments of the source code 152. In response, the server 140 may modify the source code 152 and return an API response 106 that indicates the source code 152 is modified. The API response 106 may further be in response to the task 170 associated with the source code 152 being performed by the server 140. For example, the task 170 may include retrieving and communicating certain data to a requesting user 102 and/or computing device 120. Thus, the API response 106 may be the response to the user 102 to perform the task 170.

Server

Server 140 may include one or more hardware computer systems, such as virtual machines. For example, the server 140 may be implemented by a plurality of computing devices using distributed computing and/or cloud computing systems in a network. In some embodiments, the server 140 may be a server in a server farm. The server 140 may be an instance of one or more servers 140. In certain embodiments, the server 140 may be configured to provide services and resources (e.g., data and/or hardware resources) to the components of the system 100. For example, the server 140 may perform code obfuscation operations 156, code separation operation 158, and code encryption operation 160 on one or more segments of the source code 152.

The server 140 comprises a processor 142 operably coupled with a network interface 144 and a memory 146. Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the server 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 described in FIG. 2, and one or more operations of the method 300 as described in FIG. 3.

Network interface 144 is configured to enable wired and/or wireless communications. The network interface 144 may be configured to communicate data between the server 140 and other devices, systems, or domains of the system 100. For example, the network interface 144 may comprise a near-field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, machine learning algorithm 150, source code 152, training dataset 162, software application 122, training dataset 174, code features 212, 216, feature vectors 214, 218, code obfuscation operations 156, code separation operations 158, code encryption operations 160, code splitting rule 172, task 170, and/or any other data or instructions. The software instructions 148 may comprise any suitable set of instructions, logic, rules, or code operable to execute the processor 142 and perform the functions described herein, such as some or all of those described in FIGS. 1-3.

Machine learning algorithm 150 may be implemented by the processor 142 executing software instructions 148. The machine learning algorithm 150 may be configured to scan the source code 152 and identify code segments 226, such as function codes 154, and classes, conditional loops, among others (collectively referred to herein as function code 154). The machine learning algorithm 150 may comprise a support vector machine, neural network, random forest, k-means clustering, etc. The machine learning algorithm 150 may be implemented by a plurality of neural network (NN) layers, convolutional NN (CNN) layers, Long-Short-Term-Memory (LSTM) layers, Bi-directional LSTM layers, recurrent NN (RNN) layers, and the like. In some examples, the machine learning algorithm 150 may be implemented by natural language processing (NLP), data processing, text recognition, generative text processing, code processing, code generation, etc. In certain embodiments, the machine learning algorithm 150 may perform word segmentation, sentence segmentation, word tokenization, sentence tokenization, and analysis on a given segment of the source code 152.

For example, the machine learning algorithm 150 may identify a function code 154 and add a template code 168 to the code function, where the template code 168 is associated with a sample code 164 that is configured to perform a task 166 that the function code 154 is configured to perform. This process is described in greater detail in conjunction with FIG. 2.

The machine learning algorithm 150 may be further configured to change variable names in the source code 152 to other names that are irrelevant to the function of the source code 152. For example, the machine learning algorithm 150 may replace a variable name that is indicative of its purpose, such as Balance, with a neutral or unrelated term, such as an alphanumeric value. In some embodiments, the machine learning algorithm 150 may determine the new variables randomly, e.g., using a random alphanumeric value generator, and/or may follow a hashing table where each variable name is mapped to a specific hash value, and the hash values are used to refer to the variable names in the source code 152.

The machine learning algorithm 150 may be further configured to encrypt code segment 226, including comment lines. For example, through supervised machine learning, the machine learning algorithm 150 may learn to identify the comment lines, e.g., based on identifying a comment indicator (e.g., #, /*, etc.) that is followed by a comment line. In response, the machine learning algorithm 150 may encrypt the comment lines using an encryption key. The machine learning algorithm 150 may be further configured to change the data structure of each code segment of the source code 152 to another data structure.

The machine learning algorithm 150 may be further configured to separate a function code 154 into a set of code segments according to the code splitting rule 172. The code splitting rule 172 may indicate that a given function code 154 is to be split such that each split code segment, individually, does not infer a task 170 which the given function code 154 is configured to perform.

The training dataset 162 may be used to train the machine learning algorithm 150 to perform one of more of its operations. The training dataset 162 may include a set of sample codes 164. Each sample code 164 may be associated with a task 166 that the respective sample code 164 is configured to perform and a template code 168. The template code 168 is historically used to obfuscate the respective sample code 164. For example, the template code 168 may include an irrelevant code segment that does not alter the task 166 of the sample code 164. In some examples, the template code 168 may be configured to perform the task 166 associated with the respective sample code 164 and/or other tasks. Thus, when the template code 168 is added to the code (e.g., the sample code 164 or the function code 154), the code may appear more complex than it actually is. The template code 168 does not alter the function and operational flow of the sample code 164.

The machine learning algorithm 150 may be trained using the training dataset 162 to identify which template code 168 is to be added to a function code 154. For example, the machine learning algorithm 150 may determine that the sample code 164*a* is associated with the task 166*a*, the function code 154 is configured to perform the task 170, and that the task 166*a* corresponds to the task 170. In response, the machine learning algorithm 150 may insert the template code 168*a* into the function code 154. This process is described in greater detail in FIG. 2.

Operational Flow for Protecting Source Code from Unauthorized Access

FIG. 2 illustrates an example operational flow 200 of the system 100 (see FIG. 1) for protecting the source code 152 from unauthorized access, e.g., via cyberattacks. In operation, the operational flow 200 may begin in response to the server 140 receiving the instruction 210 that indicates to execute the code security operations (e.g., code obfuscation operation 156, code separation operation 158, and code encryption operation 160). For example, the instruction 210 may indicate to obfuscate at least a portion of the source code 152, separate at least a portion of the source code 152, and/or encrypt at least a portion of the source code 152. Thus, in some embodiments, the operational flow 200 may begin in response to a trigger, e.g., receiving the instruction 210. The instruction 210 may be included in the API request 104. The server 140 may receive the instruction 210 from the computing device 120 when the user 102 initiates the transmission of the instruction 210. In some embodiments, the operational flow 200 may begin automatically when the source code 152 is developed and saved in the server 140.

Scanning the Source Code

In some embodiments, the operational flow 200 may begin when the source code 152 of the API is triggered to allow access to the software application 122. The source code 152 may include a set of code lines that include one or more function codes 154. In response to receiving the instructions 210, the server 140, via the machine learning algorithm 150, may scan the source code 152 by parsing the set of code lines of the source code to identify and characterize various code constructs/segments. The source code 152 may be fed to the neural network of the machine learning algorithm 150 as an input.

The machine learning algorithm 150 may implement a syntactic code analysis to identify the structure of the code by breaking down the source code 152 into tokens, which may include keywords, operators, identifiers, and other syntax elements. The machine learning algorithm 150 may use parsing algorithms to parse the source code 152 to construct a syntax tree that represents the hierarchical structure of the source code 152. The hierarchical structure of the source code 152 may represent the relationship of different code segments 226 with other segments 226 and the role of each code segment 226, among others. The machine learning algorithm 150 may perform code semantic analysis to determine the task 170 of each code segment 226 (e.g., function code 154, etc.).

In some embodiments, the machine learning algorithm 150 may use NLP and generate text processing to identify the patterns and structures within the source code 152 which may not be determined by syntax analysis. The machine learning algorithm 150 may extract a set of code features 212 from the source code 152, where the set of code features 212 may include the hierarchical structure of the source code 152, indication of each code segment 226 (e.g., function code 154, etc.), indication of the task 170 which each code segment 226 is configured to perform, patterns and structures within the source code 152, among others. The set of code features 212 may be represented by the code vector 214. The code vector 214 may include a set of numerical values representing the code features 212.

In some embodiments, the machine learning algorithm 150 may determine the code features 212 associated with the function code 154 from among the set of code features 212 and generate a feature vector 214 that includes the code features 212 specific to the function code 154. The code features 212 may refer to the source code 152 or one or more code segments 226 of the source code 152.

Obfuscating the Function Code

In some embodiments, the machine learning algorithm 150 may increase the security of the function code 154 by performing the code obfuscation operations 156. In this process, the machine learning algorithm 150 may evaluate each code segment 226 against the training dataset 162. For example, the machine learning algorithm 150 may scan each sample code 164 (similar to that described above with respect to scanning the source code 152) of the training dataset 162, and in response, extract the set of code features 216 from each sample code 164. For example, with respect to the sample code 164*a*, the machine learning algorithm 150 may scan the sample code 164*a* and extract a set of code features 216 from the sample code 164*a*, where the set of code features 216 may include the hierarchical structure of the sample code 164*a*, indication of each code segment (e.g., function code, etc.), indication of the task 166*a* which each code segment (e.g., function code, etc.) is configured to perform, patterns and structures within the sample code 164*a*, among others. The set of code features 216 may be represented by the code vector 218. The code vector 218 may include a set of numerical values representing the code features 216.

The machine learning algorithm 150 may determine to which sample code 164 the function code 154 corresponds. To this end, the machine learning algorithm 150 may compare the feature vector 214 (that is associated with the function code 154) with feature vector 218 associated with each sample code 164. For example, with respect to the sample code 164*a*, the machine learning algorithm 150 may compare the feature vector 214 with the feature vector 218 associated with the sample code 164*a*. This process may include determining similarities and differences between the code features 212 and the code features 216. In this process, the machine learning algorithm 150 may determine a distance (e.g., Euclidean distance) between the feature vector 214 and feature vector 218 in a vector space. If the distance is less than a threshold distance (e.g., less than 0.1, 0.01, etc.), the machine learning algorithm 150 may determine that the feature vector 214 corresponds to the feature vector 218.

The machine learning algorithm 150 may identify the task 166*a* associated with the sample code 164*a* as indicated in the training dataset 162. The machine learning algorithm 150 may compare the task 166*a* to the task 170 which is associated with the function code 154. The machine learning algorithm 150 may determine whether the task 166*a* corresponds to the task 170. If it is determined that the task 166*a* corresponds to the task 170, the machine learning algorithm 150 may determine that the function code 154 performs the same task as the sample code 164*a*. In response, the machine learning algorithm 150 may obfuscate the function code 154 using the template code 168*a*. The template code 168*a* may historically have been used to obfuscate function codes that are similar to and/or correspond to the sample code 164*a*.

In some embodiments, the machine learning algorithm 150 may obfuscate the function code 154 using the template code 168*a* by updating the function code 154 to include the sample code 164*a*. For example, the machine learning algorithm 150 may insert the template code 168*a* into the function code 154 such that the added template code 168*a* does not alter the flow or operation of the function code 154. In some embodiments, the machine learning algorithm 150 may obfuscate the function code 154 using the template code 168*a* by replacing a counterpart code segment, among the code lines of the function code 154, that is configured to perform the same task as the template code 168*a*. For example, the template code 168*a* may be written, configured, and programmed to have more complexity than the counterpart code segment among the code lines of the function code 154. In some embodiments, the template code 168*a* may include irrelevant code segments that do not alter the task 170 associated with the function code 154.

In some embodiments, the machine learning algorithm 150 may obfuscate the function code 154 in a variety of methods. For example, the machine learning algorithm 150 may change variable names used in the function code 154 to other variable names, such that the other variable names are irrelevant to the task 170 associated with the function code 154. For example, the machine learning algorithm 150 may change the variable names to alphanumeric variable names. The machine learning algorithm 150 may update the source code 152 to include the updated function code 154.

Splitting the Code Function

In some embodiments, the machine learning algorithm 150 may increase the security of the function code 154 by performing the code separation operation 158. In this process, the machine learning algorithm 150 may split the function code 154 into a set of code segments 220, such as code segments 220*a-d* as shown in the example of FIG. 2. In other examples, the function code 154 may be split into any number of code segments 220. The machine learning algorithm 150 may split the function code 154 according to the code splitting rule 172, where the code splitting rule 172 indicates that a given function code 154 is to be split such that each split code segment, individually, does not infer a task 170 which the given function code 154 is configured to perform.

To split the function code 154 according to the code splitting rule 172, the machine learning algorithm 150 is trained on a diverse dataset of codes, which includes examples of function codes before and after the splitting operation according to the code splitting rule 172. The code splitting rule 172 serves as a guideline for the machine learning algorithm 150 during this training phase, to learn the characteristics of code segments that, when separated, do not reveal the overall task or functionality they collectively represent. The machine learning algorithm 150, through iterative learning, learns to recognize patterns and structures that indicate functional boundaries within the function code 154. The machine learning algorithm 150 may determine break points at which to divide the function code 154 to reduce the intelligibility of each segment's role while maintaining the complete functionality when reassembled during execution.

During the training phase, the machine learning algorithm 150 is trained with a set of sample codes 164 (before being split) and tasked with splitting each of these sample codes 164 in accordance with the code splitting rule 172. Each sample code 164 may be associated with a respective set of split code segments 222, which are examples of the desired output in accordance with the code splitting rule 172. For example, the sample code 164*a* may be associated with the set of split code segments 222*a*.

The machine learning algorithm 150 learns the association between the sample code 164*a* (before splitting) and the set of code segments 222*a* (after splitting) by analyzing the structure and content of the sample code 164*a*, determining the functions and operations that comprise the task of the sample code 164*a*, and analyzing the breakpoints that led to splitting the sample code 164*a* into the set of code segments 222*a*. The machine learning algorithm 150 may determine how these functions interconnect within the sample code 164*a* and how they are divided among the set of split code segments 222*a*. The machine learning algorithm 150 identifies patterns, dependencies, and characteristics that allow the machine learning algorithm 150 to apply similar splitting logic to new, unprocessed code, such as function code 154.

Once the machine learning algorithm 150 has been trained, it applies these learned splitting strategies to new function codes 154. In this process, the machine learning algorithm 150 may use predictive modeling to identify the possible segmentation breakpoints that comply with the code splitting rule 172. This may involve assessing the complexity of each segment 220*a-d*, to ensure that no individual piece of code segments 220*a-d* would infer the task 170 associated with the original function code 154. A similar operation may be performed for a combination of two or more split code segments 220*a-d* of the function code 154.

In response, the machine learning algorithm 150 split the function code 154 according to the code splitting rule 172. In some embodiments, each of the split code segments 220*a-d* may be placed or moved to various locations within the source code 152 and/or code repository associated with the source code 152, such as separate code files, folders, directories, etc. The machine learning algorithm 150 may update the source code 152 to include the split function code 154.

Encrypting Certain Segments of the Source Code

In some embodiments, the machine learning algorithm 150 may perform code encryption operation 160 on the source code 152. In this operation, the machine learning algorithm 150 may identify the code segments that include or are associated with sensitive data, such as comment lines that include sensitive data, hard-coded security keys, access information to an API, a device, etc., among others. For example, the machine learning algorithm 150 may identify these code segments based on searching for certain keywords associated with the sensitive data. For example, the machine learning algorithm 150 may encrypt a comments line associated with a code line in the function code 154, where the comments line comprises text that describes the function of the code line. In response, the machine learning algorithm 150 may encrypt the identified code segments using an encryption key. In some embodiments, the machine learning algorithm 150 may encrypt the identified code segments using symmetric encryption and/or asymmetric encryption methods.

In some embodiments, the machine learning algorithm 150 may obfuscate the source code 152 by changing one or more data structures associated with one or more segments of the source code 152 to one or more other data structures, where the data structures may include an array, a list, a linked list, a stack, a graph, a tree, among other data structures. For example, the machine learning algorithm 150 may change a first data structure associated with a first segment of the source code 152 to a second data structure, where the second data structure is different from data structures associated with other segments of the source code. For example, each of the first and second data structures may include an array, a list, a linked list, a stack, a graph, and a tree, among other data structures.

In some embodiments, the server 140 may detect an unauthorized request 224 to access the source code 152 and perform one or more countermeasure actions (e.g., one or more of code obfuscation operation 156, code separation operation 158, and code encryption operation 160 to one or more code segments of the source code 152) to increase the security of the source code 152. For example, the server 140 may receive a request 224 to access the source code 152. In response, the server 140 may validate whether the request 224 has originated from a known, authorized device. For example, the server 140 may determine the internet protocol (IP) address associated with the request 224 based on the information contained within the header and accompanying data packets of the request 224. The server 140 may compare the determined IP address with a list of authorized IP addresses. In response, the server 140 may determine whether the IP address is among the list of authorized IP addresses. If the IP address is not among the list of authorized IP addresses, the server 140 may determine that request 224 has originated from an unknown computing device. In response, the server 140 may obfuscate the source code 152 using one or more of the methods described above, such as one or more of code obfuscation operation 156, code separation operation 158, and code encryption operation 160.

In some embodiments, the server 140 may implement dynamic lazy loading such that data (associated with the source code 152) that is requested from an authorized user/device is loaded and provided to the authorized user/device. Thus, the remaining data associated with the source code 152 is kept secure behind the firewalls and implemented security layers, such as code obfuscation operation 156, code separation operation 158, and code encryption operation 160, similar to that described above.

In some embodiments, the server 140 may compress the source code 152 and maintain the compressed source code 152. In some embodiments, the server 140 may separate dynamic link library (DLL) files associated with the source code 152 into different libraries and modules. In some embodiments, the server 140 may use hash names for code segments, code names, and code folders, collectivity referred to herein as code modules. For example, the server 140 may use a hash function to generate a hash code for each code module. Each hash code may be a random alphanumeric parameter. Using hash codes may increase the security of the source code 152.

In some embodiments, the server 140 may implement cloud computing as opposed to edge computing to perform the processing on the source code 152 on the server side as opposed to the client side. This process may reduce the amount of code exposure to the client side which may be less secure than the server side.

The machine learning algorithm 150 may undo any of the operations above (e.g., the code obfuscation operations 156, code separation operations 158, code encryption operations 160, etc.) to revert the source code 152 back to its original form before compiling the source code 152. For example, the machine learning algorithm 150 may revert the template code **168*a* from the function code 154, combine the split code segments 220*a-d*, and decrypt the encrypted code segments. In response to reverting the source code 152 back to its original state, the machine learning algorithm 150 may compile the source code 152 and execute the complied source code 152 to perform its tasks (e.g., including tasks 170). In some embodiments, the server 140 may execute the updated source code 152** to perform a requested operation.

Example Method for Protecting Source Code from Unauthorized Access

FIG. 3 illustrates an example flowchart of a method 300 for protecting source code 152 from unauthorized access, according to some embodiments. Modifications, additions, or omissions may be made to method 300. Method 300 may include more, fewer, or other operations. For example, operations may be performed in parallel or in any suitable order. While at times it is discussed that the system 100, computing devices 120, server 140, or components of any of thereof perform some operations, any suitable system or components of the system may perform one or more operations of the method 300. For example, one or more operations of method 300 may be implemented, at least in part, in the form of software instructions 148 of FIG. 1, stored on a tangible non-transitory machine-readable medium (e.g., memory 126 of FIG. 1) that when run by one or more processors (e.g., processor 142 of FIG. 1) may cause the one or more processors to perform operations 302-322.

At operation 302, the server 140 receives an instruction 210 to obfuscate the source code 152. For example, the server 140 may receive a message comprising the instruction 210 from the computing device 120 when the user 102 initiates transmitting the message, similar to that described in FIG. 2. At operation 304, the server 140 accesses the source code 152.

At operation 306, the server 140 accesses the training dataset 162 comprising a first sample code **164*a* associated with a first task 166*a* and a first template code 168*a*. The training dataset 162 may include other sample codes 164 associated with respective tasks 166 and template code 168, similar to that described in FIG. 2**.

At operation 308, the server 140 scans the source code 152. In this operation, the server 140 may determine the structure of the source code 152, determine the code segments 226 of the source code 152 (including function codes 154, etc.), the role of each code segment 226, and patterns within the source code 152, similar to that described in FIG. 2. Each code segment 226 may be or include a function, a class, a conditional statement, a loop (e.g., a for loop, a while loop, etc.), and/or any other code structures.

At operation 310, the server 140 selects a code segment 226 from the source code 152, where the code segment 226 comprises a function code 154. The server 140 may iteratively select a code segment 226 until no code segment 226 is left for evaluation.

At operation 312, the server 140 extracts a first set of code features 212 from the source code 152 (or from the selected code segment 226), where the first set of code features 212 comprises an indication of a second task 170 with which the function code 154 (included in the selected code segment 226) is configured to perform. For example, the server 140 may feed the source code 152 to the machine learning algorithm 150 to scan the source code 152 and extract the code features 212 from the source code 152 (or from the selected code segment 226), similar to that described in FIG. 2.

At operation 314, the server 140 compares the first task 166*a* with the second task 170. For example, the server 140, via the machine learning algorithm 150, may compare the feature vector 214 with the feature vector 218, similar to that described in FIG. 2.

At operation 316, the server 140 determines whether the first task 166*a* corresponds to the second task 170. If it is determined that the first task 166*a* corresponds to the second task 170, the method 300 proceeds to operation 318. Otherwise, the method 300 may return to operation 310.

At operation 318, the server 140 obfuscates the function code 154 by updating the function code 154 with the first template code 168*a*. For example, the server 140 may replace a counterpart code segment within the function code 154 that is configured to perform the same task as the first template code 168*a*, similar to that described in FIG. 2. In another example, the server 140 may add the first template code 168*a* to the function code 154, similar to that described in FIG. 2

At operation 320, the server 140 updates the source code 152 with the updated function code 154. At operation 322, the server 140 determines whether to select another code segment 226 from the source code 152. If it is determined that another code segment 226 is present, the method 300 returns to operation 310. Otherwise, the method 300 ends. In some embodiments, the method 300 may include any one or more of the operations described in FIG. 2, including code obfuscation operation 156, code separation operation 158, and code encryption operations 160. For example, the server 140 may perform any one or more of code obfuscation operation 156, code separation operation 158, and code encryption operations 160 on any one or more code segments 226 of the source code 154.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for securing source code from unauthorized access, comprising:

a memory configured to store:

source code comprising a set of code lines, wherein the set of code lines comprises a first function code; and a training dataset comprising a set of sample codes, wherein a first sample code from among the set of sample codes is associated with a first task which the first sample code is configured to perform and a first template code; and a processor, operably coupled to the memory, and configured to:

train a machine learning algorithm on the training dataset to identify which template code from the training dataset is to be added to a given function code of the source code based at least in part upon a task of the given function code, such that the identified template code is configured to perform the task of the given function code, and comprises an irrelevant code segment that does not alter the task;

train the machine learning algorithm on a second set of sample codes, wherein each sample code is associated with a respective set of split code segments after splitting the sample code according to a function splitting rule;

receive an instruction to obfuscate at least a portion of the source code;

in response to receiving the instruction:

scan the source code;

in response to scanning the source code, identify, via the trained machine learning algorithm, a plurality of break points that indicates boundaries to divide the first function code according to the function splitting rule;

split the first function code at the plurality of break points into a plurality of code segments such that each code segment, individually, does not infer a task that the first function code is configured to perform;

extract, via the trained machine learning algorithm, a first set of code features from the first function code, wherein the first set of code features comprises an indication of a second task which the first function code is configured to perform;

compare the first task with the second task;

determine that the first task corresponds to the second task;

in response to determining that the first task corresponds to the second task, obfuscate the first function code, wherein obfuscating the first function code comprises updating the first function code with the first template code, wherein updating the first function code with the first template code comprises replacing at least a portion of the first function code with the first template code; and update the source code to include the updated first function code.

2. The system of claim 1, wherein the processor is further configured to:

generate a first feature vector to represent the first set of code features;

extract, via the trained machine learning algorithm, a second set of code features from the first sample code;

generate a second feature vector to represent the second set of code features;

compare the first feature vector with the second feature vector by determining a distance between the first feature vector and the second feature vector in a vector space; and determine that the distance between the first feature vector and the second feature vector is less than a threshold distance, wherein determining that the first task corresponds to the second task is in response to determine that the distance between the first feature vector and the second feature vector is less than the threshold distance.

3. The system of claim 1, wherein the processor is further configured to:

revert the first function code to an initial state before the source code is compiled;

compile the source code; and execute the compiled source code to perform the first task.

4. The system of claim 1, wherein obfuscating the first function code comprises changing a first variable name used in the first function code to a second variable name, wherein the second variable name is irrelevant to the first task associated with the first function code.

5. The system of claim 1, wherein obfuscating the first function code comprises encrypting a comment line associated with a code line in the first function code, wherein the comment line comprises text that describes a function of the code line.

6. The system of claim 1, wherein:

the set of code lines further comprises a second function code configured to perform a third task;

the memory is further configured to store the function splitting rule, wherein the function splitting rule indicates that the given function code is to be split such that each split code segment, individually, does not infer a task which the given function code is configured to perform; and the processor is further configured to obfuscate the second function code by dividing the second function code into a set of code segments according to the function splitting rule.

7. The system of claim 1, wherein the processor is further configured to obfuscate the source code by changing a first data structure associated with a portion of the source code to a second data structure, wherein the second data structure is different from data structures associated with other parts of the source code, wherein each of the first data structure and the second data structure comprises at least one of an array, a list, a linked list, or a stack.

8. A method for securing source code from unauthorized access, comprising:

storing:

source code comprising a set of code lines, wherein the set of code lines comprises a first function code; and a training dataset comprising a set of sample codes, wherein a first sample code from among the set of sample codes is associated with a first task which the first sample code is configured to perform and a first template code;

training a machine learning algorithm on the training dataset to identify which template code from the training dataset is to be added to a given function code of the source code based at least in part upon a task of the given function code, such that the identified template code is configured to perform the task of the given function code, and comprises an irrelevant code segment that does not alter the task;

training the machine learning algorithm on a second set of sample codes, wherein each sample code is associated with a respective set of split code segments after splitting the sample code according to a function splitting rule;

receiving an instruction to obfuscate at least a portion of the source code;

in response to receiving the instruction:

scanning the source code; and in response to scanning the source code, identifying, via the trained machine learning algorithm, a plurality of break points that indicates boundaries to divide the first function code according to the function splitting rule;

splitting the first function code at the plurality of break points into a plurality of code segments such that each code segment, individually, does not infer a task that the first function code is configured to perform;

extracting, via the trained machine learning algorithm, a first set of code features from the first function code, wherein the first set of code features comprises an indication of a second task which the first function code is configured to perform;

comparing the first task with the second task;

determining that the first task corresponds to the second task;

in response to determining that the first task corresponds to the second task, obfuscating the first function code, wherein obfuscating the first function code comprises updating the first function code with the first template code, wherein updating the first function code with the first template code comprises replacing at least a portion of the first function code with the first template code; and updating the source code to include the updated first function code.

9. The method of claim 8, further comprising:

generating a first feature vector to represent the first set of code features;

extracting, via the trained machine learning algorithm, a second set of code features from the first sample code;

generating a second feature vector to represent the second set of code features;

comparing the first feature vector with the second feature vector by determining a distance between the first feature vector and the second feature vector in a vector space;

determining that the distance between the first feature vector and the second feature vector is less than a threshold distance, wherein determining that the first task corresponds to the second task is in response to determining that the distance between the first feature vector and the second feature vector is less than the threshold distance.

10. The method of claim 8, further comprising:

reverting the first function code to an initial state before the source code is compiled; compiling the source code; and executing the compiled source code to perform the first task.

11. The method of claim 8, wherein obfuscating the first function code comprises changing a first variable name used in the first function code to a second variable name, wherein the second variable name is irrelevant to the first task associated with the first function code.

12. The method of claim 8, wherein obfuscating the first function code comprises encrypting a comment line associated with a code line in the first function code, wherein the comment line comprises text that describes a function of the code line.

13. The method of claim 8, wherein:

the set of code lines further comprises a second function code configured to perform a third task; and the method further comprises:

storing the function splitting rule, wherein the function splitting rule indicates that the given function code is to be split such that each split code segment, individually, does not infer a task which the given function code is configured to perform; and obfuscating the second function code by dividing the second function code into a set of code segments according to the function splitting rule.

14. The method of claim 8, further comprising obfuscating the source code by changing a first data structure associated with a portion of the source code to a second data structure, wherein the second data structure is different from data structures associated with other parts of the source code, wherein each of the first data structure and the second data structure comprises at least one of an array, a list, a linked list, or a stack.

15. A non-transitory computer-readable medium storing instructions that, when executed by a processor, cause the processor to:

train a machine learning algorithm on a training dataset to identify which template code from the training dataset is to be added to a given function code of source code based at least in part upon a task of the given function code, such that the identified template code is configured to perform the task of the given function code, and comprises an irrelevant code segment that does not alter the task;

train the machine learning algorithm on a second set of sample codes, wherein each sample code is associated with a respective set of split code segments after splitting the sample code according to a function splitting rule;

receive an instruction to obfuscate at least a portion of the source code, wherein the source code comprises a set of code lines comprising a first function code;

in response to receiving the instruction:

scan the source code;

in response to scanning the source code, identify, via the trained machine learning algorithm, a plurality of break points that indicates boundaries to divide the first function code according to the function splitting rule;

split the first function code at the plurality of break points into a plurality of code segments such that each code segment, individually, does not infer a task that the first function code is configured to perform;

extract, via the trained machine learning algorithm, a first set of code features from the first function code, wherein the first set of code features comprises an indication of a second task which the first function code is configured to perform;

access the training dataset comprising a set of sample codes, wherein a first sample code from among the set of sample codes is associated with a first task which the first sample code is configured to perform and a first template code;

compare the first task with the second task;

determine that the first task corresponds to the second task;

in response to determining that the first task corresponds to the second task, obfuscate the first function code, wherein obfuscating the first function code comprises updating the first function code with the first template code, wherein updating the first function code with the first template code comprises replacing at least a portion of the first function code with the first template code; and update the source code to include the updated first function code.

16. The non-transitory computer-readable medium of claim 15, wherein the instructions further cause the processor to:

generate a first feature vector to represent the first set of code features;

extract, via the trained machine learning algorithm, a second set of code features from the first sample code;

generate a second feature vector to represent the second set of code features;

compare the first feature vector with the second feature vector by determining a distance between the first feature vector and the second feature vector in a vector space; and determine that the distance between the first feature vector and the second feature vector is less than a threshold distance, wherein determining that the first task corresponds to the second task is in response to determine that the distance between the first feature vector and the second feature vector is less than the threshold distance.

17. The non-transitory computer-readable medium of claim 15, wherein the instructions further cause the processor to:

revert the first function code to an initial state before the source code is compiled; compile the source code; and execute the compiled source code to perform the first task.

18. The non-transitory computer-readable medium of claim 15, wherein obfuscating the first function code comprises changing a first variable name used in the first function code to a second variable name, wherein the second variable name is irrelevant to the first task associated with the first function code.

19. The non-transitory computer-readable medium of claim 15, wherein obfuscating the first function code comprises encrypting a comment line associated with a code line in the first function code, wherein the comment line comprises text that describes a function of the code line.

20. The non-transitory computer-readable medium of claim 15, wherein the instructions further cause the processor to:

receive a request to access the source code; and determine that the request has originated from an unknown computing device, wherein determining that the request has originated from the unknown computing device comprises determining that an internet protocol (IP) associated with the unknown computing device is not among a set of authorized IP addresses; and obfuscate the first function code is in response to determining that the request has originated from the unknown computing device.

* * * * *